United States Patent Office 3,471,620
Patented Oct. 7, 1969

3,471,620
ANTHELMINTIC COMPOSITIONS AND METHODS EMPLOYING 2 - (2' - THIAZOLIN - 2' - YL)-BENZIMIDAZOLES
George Holan, Brighton, Victoria, and Brian Colwell Ennis, Ripponlea, Victoria, Australia, assignors to Monsanto Chemicals (Australia) Limited, West Footscray, Victoria, Australia, a company of Australia
No Drawing. Original application Dec. 16, 1965, Ser. No. 514,388, now Patent No. 3,399,208, dated Aug. 27, 1968. Divided and this application Sept. 12, 1967, Ser. No. 679,947
Int. Cl. A61k 27/00; C07d 99/10
U.S. Cl. 424—270                 13 Claims

ABSTRACT OF THE DISCLOSURE

Anthelmintic compositions comprising 2-(2'-thiazolin-2'-yl)-benzimidazoles of the formula

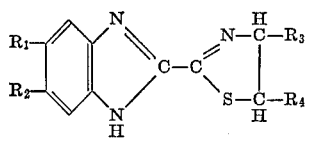

wherein $R_1$ and $R_2$ are selected from hydrogen, halogen, alkyl having 1 to 6 carbon atoms and alkoxy having 1 to 6 carbon atoms, and $R_3$ and $R_4$ are selected from hydrogen and alkyl having 1 to 6 carbon atoms.

---

This application is a division of applicants' copending application Ser. No. 514,388 filed Dec. 16, 1965, now U.S. Patent No. 3,399,208.

This invention relates to new 2-substituted benzimidazoles which are useful as biological toxicants, particularly in combating helminthiasis, i.e., the treatment of animals suffering from an infestation of the gastrointestinal tract with parasitic worms. The compounds of the invention combine a high degree of activity towards the parasites with a low toxicity towards the host, and moreover are relatively cheap to manufacture.

The new compounds of the invention are the 2-(2'-thiazolin-2'-yl)-benzimidazoles having the structural formula:

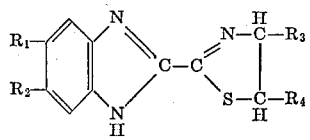

wherein $R_1$ and $R_2$ are selected from hydrogen, halogen, alkyl having 1 to 6 carbon atoms and alkoxy having 1 to 6 carbon atoms, and $R_3$ and $R_4$ are selected from hydrogen and alkyl having 1 to 6 carbon atoms. $R_1$ and $R_2$ conveniently are selected from hydrogen, chlorine, methyl, ethyl, methoxy and ethoxy, while $R_3$ and $R_4$ conveniently are selected from hydrogen and methyl.

Illustrative of the compounds embraced by the invention are 2-(2'-thiazolin-2'-yl)-benzimidazole;
2-(2'-thiazolin-2'-yl)-5,6-dimethylbenzimidazole;
2-(2'-thiazolin-2'-yl)-5-chlorobenzimidazole;
2-(2'-thiazolin-2'-yl)-5-methoxybenzimidazole; and
2-(4'-methyl-2'-thiazolin-2'-yl)-benzimidazole.

Veterinary application of the specified compounds of the invention for the treatment of helminthiasis in animals can be carried out using anthelmintic preparations, for example, in the form of an aqueous suspension ready to use or in the form of a water-wettable or water-dispersible powder which is mixed with water prior to use as a drench; or in the form of suitably formulated tablets or capsules; or the specified compounds may be admixed with animal feedstuffs, as a dry powder or in granulated form. The anthelmintic preparations containing the specified compounds of the invention are preferably administered orally, as a liquid drench, or as a tablet or capsule, in unit dosage form, since this is generally considered to be the most effective manner of combating helminthiasis. Alternatively, the specified compounds of the invention can be incorporated in urea or salt licks or blocks, so that the animals receive the anthelmintic material with the urea or salt.

A liquid-suspension formulation may contain from 3% to 50% by weight, preferably 5% to 30% by weight of the active compound together with a dispersing agent and stabilizing agent. A typical formulation is as follows:

|  | Parts weight |
|---|---|
| Active compound | 5–15 |
| Dispersing agent | ½–2 |
| Stabilizing agent | 1–15 |

Preservative, as required.
Water sufficient to make 100 parts.

Suitable dispersing agents are those containing sulphonate groups, for example, sodium lignin sulphonate or the sulphonated phenol or naphthol formaldehyde polymers. Bentonite may be employed as the stabilizing agent, although it is possible to use such protective colloids as polyvinyl alcohol, carboxymethyl cellulose, sodium alginate and the like. The formulations can be prepared by mixing the active compound and the water which already contains dissolved therein the dispersing agents, and other components very vigorously by means of suitable mechanical mixing equipment.

A wettable or water-dispersible powder formulation may contain about 50% to 98% by weight of the active compound together with a wetting agent and dispersing agent. A diluent such as Kaolin can also be added if a concentration below about 95% by weight is required. An anti-foaming agent, and, in some cases, a stabilizing agent may be present. A typical formulation is as follows:

|  | Parts weight |
|---|---|
| Active compound | 50–90 |
| Wetting agent | 0–2 |
| Dispersing agent | 0–2 |
| Stabilizing agent | 0–10 |
| Anti-foaming agent | 0.01–1 |
| Water | 0–5 |

Suitable wetting agents are the nonionic alkylphenyl-ethylene oxide adducts such as an octylphenol or nonylphenol condensed with ten moles of ethylene oxide, or anionic materials such as the synthetic aryl alkyl sulfonates, examples of which are sodium dodecyl benzene sulfonate, or sodium dibutyl naphthalene sulfonate. Usually about 1% w./w. of wetting agent is required. Suitable dispersing agents are similar to those used for liquid suspensions, for example, sodium lignin sulfonate. The anti-foaming agent employed may be either a silicone or such materials as ethyl hexanol, octanol and the like; and the stabilizing agent may again be chosen from bentonite or the water-soluble gums. Water-wettable or water-dispersible powder formulations are prepared by careful and adequate mixing of the active compound with other ingredients with or without the addition of some water using typical powder blending equipment such as a ribbon blender. The powder formulation is stirred into water by the user before application as a drench, in the field.

Tablets or capsules containing the specified compounds of the invention are prepared my intimately mixing and compounding the active component with suitable finely-divided diluents, fillers, disintegrating agents and/or binders such as starch, lactose, talc, magnesium stearate, and vegetable gums. These formulations may be widely varied with respect to their total weight and content of anthelmintic agent, depending on factors such as the type of host animal to be treated, the dose level desired, and the severity and type of parasitic infestation.

Feed supplements, in which the specified compounds of the invention are intimately mixed with a carrier or diluent in finely-divided powder or granular form, are suitable for addition to the animals ration or feedstuff. The carrier or diluent material preferably is one which can be an animal ration ingredient. The supplement should be suitable for direct addition to the animal ration or feedstuff, or, after easy dilution and blending by the user.

The anthelmintic activity of a representative member of the specified compounds of the invention was assessed by the modified McMaster egg counting technique as described by H. B. Whitlock and H. McL. Gordon; J. Coun. Sci. Ind. Res. (Aust.) 12: p. 50, 1939 and H. B. whitlock, J. Coun. Sci. Ind. Res. (Aust.) 27: p. 177, 1948. Anthelmintic efficiency of 2-(2'-thiazolin-2'-yl)-benzimidazole was evaluated in field trials against immature and mature *Haemonchus contortus*. Thirty (30) penned sheep were each infested with 3,000 *Haemonchus contortus* larvae. One group of ten (10) sheep were treated as follows:

Test compound/animal body weight
Days after infestation:
5 _____ 1 lamb drenched with 50 mg./kg.
5 _____ 1 lamb drenched with 75 mg./kg.
10 _____ 1 lamb drenched with 50 mg./kg.
10 _____ 1 lamb drenched with 75 mg./kg.
14 _____ 1 lamb drenched with 50 mg./kg.
14 _____ 1 lamb drenched with 75 mg./kg.
21 _____ 1 lamb drenched with 50 mg./kg.
21 _____ 1 lamb drenched with 75 mg./kg.
Undrenched controls__ 2 lambs.

All drenching was carried out with a wettable powder formulation containing 0% by weight of 2-(2'-thiazolin-2'-yl)-benzimidazole. After 30 days infestation, the reduction in egg count due to treatment was found to be as follows:

|  | Test Compound/Body Weight | |
|---|---|---|
|  | 50 mg./kg. | 75 mg./kg. |
| 5 days, percent | 97.4 | 97.4 |
| 10 days, percent | 88.0 | 100.0 |
| 14 days, percent | 83.0 | 98.0 |
| 21 days, percent | 98.7 | 100.0 | by comparing the residual egg count in the treated animals with the mean egg count of the untreated controls. The minimum egg count in the untreated animals, including the twenty (20) animals subsequently diverted to the testing program and the two (2) controls, was 6,000 eggs/gm. This indicates that at both 50 and 75 mg./kg. concentrations of test compound/body weight, the test compound 2-(2'-thiazolin-2'-yl)-benzimidazole is highly efficient against immature *Haemonchus contortus*, these worms being regarded as immature at up to 15–18 days old, and mature thereafter.

Equivalent evaluation of the anthelmintic efficiency of the same test compound, i.e. 2-(2'-thiazolin-2'-yl)-benzimidazole, against immature and mature *Trichostrongylus colubriformis* gave the following results:

|  | Test Compound/Body Weight | |
|---|---|---|
|  | 50 mg./kg. | 75 mg./kg. |
| 5 days after infestation, percent | 100 | 100 |
| 8 days after infestation, percent | 100 | 100 |
| 12 days after infestation, percent | 94 | 100 |
| 21 days after infestation, percent | 100 | 100 |

Equivalent evaluation of the anthelmintic efficiency of the same test compound, i.e. 2-(2'-thiazolin-2'-yl)-benzimidazole, against immature and mature *Nematodirus filicollis* gave the following results:

|  | Test Compound/Body Weight | |
|---|---|---|
|  | 50 mg./kg. | 75 mg./kg. |
| 5 days after infestation, percent | (¹) | 100 |
| 11 days after infestation, percent | 86 | 100 |
| 21 days after infestation, percent | 72 | 100 |

¹ No test.

Toxicity field trials were carried out with pregnant sheep under abundant feed conditions, as follows: seventy-five (75) sheep were drenched with 50 mg./kg. of the same test compound, i.e. 2-(2'-thiazolin-2'-yl)-benzimidazole, and, for comparison, one hundred and thirty-four (134) sheep were each drenched with the same amount of 2-(2'-thiazolyl)-benzimidazole. Thirty-seven (37) days later, each test group of sheep was re-drenched with the same amount of the appropriate test compounds, no losses or adverse effects being noted to that date. Twenty-two (22) days later, each test group of sheep was re-drenched with the same amount of the appropriate test compounds, no losses or adverse effects being noted to that date. The seventy-five (75) ewes drenched with 2-(2'-thiazolin-2'-yl)-benzimidazole produced sixty-three (63) lambs (84% crop), which were reared up to marking age, while the one hundred and thirty-four (134) ewes drenched with 2-(2'-thiazolyl)-benzimidazole produced ninety-eight (98) lambs (73% crop), which were reared up to marking age.

Compounds in accordance with the invention may be prepared by the method which comprises reacting a 2-trichloromethylbenzimidazole with a β-mercaptoalkylamine, as illustrated in the following equation:

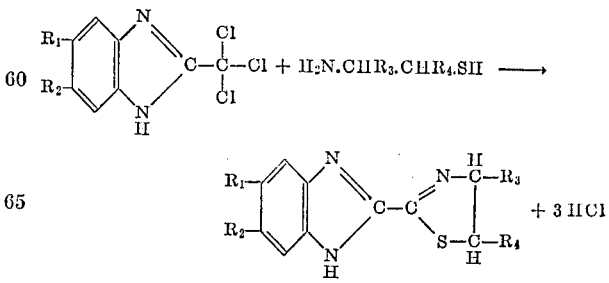

wherein $R_1$, $R_2$, $R_3$ and $R_4$ are as defined above. Thus, 2-trichloromethylbenzimidazole reacts spontaneously on mixing with an excess of β-mercaptoethylamine at room temperature to give 2-(2'-thiazolin-2'-yl)-benzimidazole in high yield.

An inert diluent or solvent, such as 1,2-dimethoxyethane or ethyl acetate or an alcohol, may be used in carrying out the preparation of said compounds in order to give a more easily controlled reaction. The β-mercaptoethylamine may be conveniently used as the hydrochloride, the free base being generated in situ by the addition of a base such as a sodium alkoxide, or a tertiary amine. The order of mixing the reagents, or the molar proportion of the reagents, is not critical, however, an excess of the amine can be employed to neutralize the hydrogen chloride formed in the reaction. The reaction temperature is preferably held as low as possible in order to minimize the extent of side reactions. The optimum temperatures vary appreciably with the nature of the substituents $R_1$, $R_2$, $R_3$ and $R_4$, but is in general of the order of 20–80° C. The reaction product is separated from solvent and amine hydrochloride by conventional means.

Preparation of the new compounds of the invention is illustrated in the following non-limitative practical examples:

EXAMPLE 1

2-(2'-thiazolin-2'-yl)-benzimidazole was prepared as follows:

2-mercaptoethylamine hydrochloride (1.1 g.) was added to a solution of sodium (0.92 g.) in ethanol. 2-trichloromethylbenzimidazole (2.3 g.) was added to this solution at room temperature when an exothermic reaction set in. The product was collected after 1 hour, washed with water, and recrystallized from ethanol to give 2-(2'-thiazolin-2'-yl)-benzimidazole as plates, M.P. 292–294° (d). Found: C, 59.1; H, 4.5; N, 20.2; S, 16.2. $C_{10}H_9N_3S$ requires: C, 59.1; H, 4.5; N, 20.7; S,15.8%.

The 2-(2'-thiazolin-2'-yl)-benzimidazole compound may be alkylated on the benzimidazole nitrogen to give 1-alkyl derivatives of that parent compound. These derivatives retain a strong absorption at 1,000–1,010 cm.$^{-1}$ in the infrared spectra, which is a frequency characteristic of the thiazolinyl system present in the parent compound, however, for purpose of comparison, this characteristic is absent from 2-(2'-thiazolyl)-benzimidazole. Confirmation of the partially saturated ring of the parent compound 2-(2'-thiazolin-2'-yl)-benzimidazole is provided by the nuclear magnetic resonance spectra of that compound, as well as the alkylated derivatives, compared with the unsaturated ring system of 2-(2'-thiazolyl)-benzimidazole. The spectra were carried out in deutero chloroform (except for the parent compound, which was dissolved in dimethyl formamide) on a Varian 60 Proton Magnetic Resonance Spectrometer. The spectra of the parent compound and the alkyl derivatives show two triplets at $\sigma$=4.5 and 3.3 p.p.m. (J=8 cps.) corresponding to the two methylene groups of the thiazolinyl ring, whereas there is no absorption in the region for the 2-(2'-thiazolyl)-benzimidazole compound, the olefinic protons of which appear as a pair of doublets at $\sigma$=8.9 and 7.5 p.p.m. (J=3.3 cps.). In addition, 2-(2'-thiazolyl)-benzimidazole is relatively stable in dilute mineral acid whereas 2-(2'-thiazolin-2'-yl)-benzimidazole is rapidly hydrolyzed under the same conditions.

The mercaptoalkylamine component used in Example 1 may be prepared in situ by reaction of alkylene imine and hydrogen sulphide according to known procedure, and the reaction product then reacted with the 2-trichloromethylbenzimidazole component to produce compounds in accordance with the invention, as illustrated in Example 2 as follows:

EXAMPLE 2

2-(2'-thiazolin-2'-yl)-benzimidazole was prepared as follows:

Ethylene imine (4.3 g.) in ethanol (40 mls.) was added to a solution of ethanol (40 mls.), saturated with hydrogen sulfide by blowing hydrogen sulfide into the solution at 0° C. over one-half hour. After a further 15 minutes the hydrogen sulfide was turned off (total $H_2S$ usage 6 g.) and the vessel purged with nitrogen. 60 mls. of the ethanol was distilled from the mixture, the flask cooled to 20° C.

and 60 mls. of water added. 2-trichloromethylbenzimidazole (10 g.) was added over 15 minutes with cooling below 50° C., the reaction was held for 2 hours, at 50° C., during this time 40% NaOH solution (7 mls.) was added to keep the reaction alkaline to phenolphthalein. The solid was filtered, washed with water and dried. The yield of pure 2-(2'-thiazolin-2'-yl)-benzimidazole M.P. 285° C. (d.) was 7.1 g. (82%).

EXAMPLE 3

5-methyl-2-(2'-thiazolin-2'-yl) - benzimidazole was prepared as follows:

5-methyl-2-trichloromethyl benzimidazole (1.0 g.) and mercaptoethylamine hydrochloride (0.5 g.) in chloroform (15 ml.) were treated with triethylamine (1.6 g.) in chloroform. There was a transient red coloration during the addition of the base and the final reaction mixture was alkaline. The reaction mixture was evaporated to dryness on a steam bath and the residue washed with water before recrystallization from cyclohexane and from carbon tetrachloride to give colorless needles, M.P. 206–7° C. of 5-methyl-2-(2'-thiazolin-2'-yl)-benzimidazole (0.7 g., ca. 90%). Found: C, 60.8; H, 5.2; N, 19.0. $C_{11}H_{11}N_3S$ requires: C, 60.8; H, 5.1; N, 19.4%.

The embodiments of the invention in which an exclusive property or privilege is claimed are defined as follows:

1. Method of controlling helminthiasis in animals which comprises orally administering to animals an anthelmintic amount of at least one compound of the formula

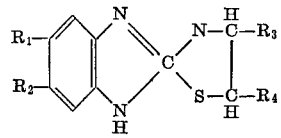

wherein $R_1$ and $R_2$ are selected from the group consisting of hydrogen, halogen, alkyl having 1 to 6 carbon atoms and alkoxy having 1 to 6 carbon atoms, and $R_3$ and $R_4$ are selected from the group consisting of hydrogen and alkyl having 1 to 6 carbon atoms.

2. Method of claim 1 in which the compound is 2-(2'-thiazolin-2'-yl)-benzimidazole.

3. Method of claim 1 in which the compound is 2-(2'-thiazolin-2'-yl)-5,6-dimethylbenzimidazole.

4. Method of claim 1 in which the compound is 2-(2'-thiazolin-2'-yl)-5-chlorobenzimidazole.

5. Method of claim 1 in which the compound is 2-(2'-thiazolin-2'-yl)-5-methoxybenzimidazole.

6. Method of claim 1 in which the compound is 2-(4'-methyl-2'-thiazolin-2'-yl)benzimidazole.

7. Anthelmintic composition comprising a carrier and an effective amount of at least one compound of the formula

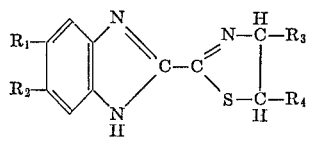

wherein $R_1$ and $R_2$ are selected from the group consisting of hydrogen, halogen, alkyl having 1 to 6 carbon atoms and alkoxy having 1 to 6 carbon atoms, and $R_3$ and $R_4$ are selected from the group consisting of hydrogen and alkyl having 1 to 6 carbon atoms.

8. A composition of claim 7 wherein the carrier is a liquid.

9. Anthelmintic composition of claim 7 in which the compound is 2-(2'-thiazolin-2'-yl)-benzimidazole.

10. Anthelmintic composition of claim 7 in which the compound is 2-(2'-thiazolin-2'-yl)-5,6-dimethylbenzimidazole.

11. Anthelmintic composition of claim 7 in which the compound is 2-(2'-thiazolin-2'-yl)-5-chlorobenzimidazole.

12. Anthelmintic composition of claim 7 in which the compound is 2-(2'-thiazolin-2'-yl)-5-methoxybenzimidazole.

13. Anthelmintic composition of claim 7 in which the compound is 2-(4'-methyl-2'-thiazolin-2'-yl)benzimidazole.

References Cited

UNITED STATES PATENTS

| | | | |
|---|---|---|---|
| 3,102,074 | 8/1963 | Brown | 167—55 |
| 3,155,571 | 11/1964 | Sarett et al. | 167—55 |
| 3,206,468 | 9/1965 | Grenda | 260—307 |

ALBERT T. MEYERS, Primary Examiner

S. J. FRIEDMAN, Assistant Examiner